APPARATUS FOR SCANNING INDICIA TRACES ON RECORD MEDIUM

Filed April 10, 1964

INVENTORS
JOHN TAYLOR
EDVARD M. PEDERSEN
BY
Flehr and Swain
ATTORNEYS

APPARATUS FOR SCANNING INDICIA TRACES ON RECORD MEDIUM

Filed April 10, 1964 5 Sheets-Sheet 2

INVENTORS
JOHN TAYLOR
EDVARD M. PEDERSEN
BY
Flehr and Swain
ATTORNEYS

Sept. 19, 1967 J. TAYLOR ETAL 3,342,997

APPARATUS FOR SCANNING INDICIA TRACES ON RECORD MEDIUM

Filed April 10, 1964 5 Sheets-Sheet 3

INVENTORS
JOHN TAYLOR
EDVARD M. PEDERSEN

BY Flehr and Swain

ATTORNEYS

APPARATUS FOR SCANNING INDICIA TRACES ON RECORD MEDIUM

Filed April 10, 1964 5 Sheets-Sheet 4

INVENTORS
JOHN TAYLOR
EDVARD M. PEDERSEN
BY
Flehr and Swain
ATTORNEYS

APPARATUS FOR SCANNING INDICIA TRACES ON RECORD MEDIUM

Filed April 10, 1964 5 Sheets-Sheet 5

JOHN TAYLOR
EDVARD M. PEDERSEN
*INVENTORS*

BY Thomas Peterson

ATTORNEY

United States Patent Office 3,342,997

Patented Sept. 19, 1967

3,342,997

APPARATUS FOR SCANNING INDICIA TRACES ON RECORD MEDIUM

John Taylor, Santa Clara, and Edvard M. Pedersen, Palo Alto, Calif., assignors to Beckman Instruments, Inc., a corporation of California Filed Apr. 10, 1964, Ser. No. 358,795
8 Claims. (Cl. 250—219)

ABSTRACT OF THE DISCLOSURE

An apparatus for scanning a row of elongated indicia traces on a film in an optical analyzing instrument. Means are provided for aligning the indicia traces on the film with the axis of the scanning slit of the optical instrument and for vertically adjusting the indicia traces longitudinally of the slit so that the midpoint of the traces can be registered properly and accurately with respect to the ends of the slit. The apparatus is particularly useful for optical analysis of the density of indicia traces formed by electrophoresis apparatus.

This invention relates to optical analyzing apparatus and more particularly to such apparatus as employed to scan a row of elongated indicia traces recorded on a record medium such as film. The apparatus is particularly useful in optical analysis of the density of indicia traces formed by electrophoresis apparatus.

In the scanning of elongated indicia traces wherein the indicia are to be aligned with the axis of a scanning slit, the slightest misalignment of the slit with the traces being scanned can, depending upon the critical nature of the analysis, generate inaccurate and unreliable results.

It is a general object of the present invention to provide improved scanning apparatus whereby elongated indicia traces can be carried into precise parallel coincidence with a scanning plane where the scanning plane is normal to the film and passes through the axis of the scanning slit. Where elongated indicia traces are recorded in a row extending transversely of the traces, it is frequently a problem, again depending upon the critical nature of the analysis being conducted, that the indicia traces may not be properly longitudinally disposed with respect to the slit.

Accordingly, it is another object of the invention to provide scanning apparatus for varying the position of the indicia traces longitudinally of the slit whereby the midpoint of the traces can be registered properly and accurately with respect to the ends of the slit so as to become properly centered or otherwise disposed therein.

These and other objects of the invention will become more readily apparent from the following detailed description of a preferred embodiment when considered in conjunction with the accompanying drawings in which:

FIGURES 1 and 2 are front and end views;

FIGURES 3 and 4 are front and back views taken at lines 3—3 and 4—4 of FIGURE 2;

FIGURE 5 is a detailed view at line 5—5 of FIGURE 4;

FIGURES 6 and 7 are end views at line 6—6 and 7—7 of FIGURE 4;

In general, there is provided for use in apparatus having a scanning slit to scan a series of elongated indicia traces recorded in a row on a record medium a film support assembly arranged to be driven through the scanning plane and to carry a sheet of film with it past the scanning slit. Scanning means are provided by a light source, an elongated slit disposed to project through a lens and onto a photoresponsive device. Thus, a beam of light is passed through the slit in a plane normal to the record medium and the film support assembly is arranged whereby to align the recorded traces for parallel coincidence with the scanning plane.

The film support apparatus is further arranged so as to vary the position of the film in a direction parallel to the scanning plane so as to register the midpoint of the recorded traces with respect to the ends of the slit. This positioning is provided by improved apparatus which serves to convert an applied movement entailing substantial lost motion to a resultant movement virtually free of lost motion while further serving to cam the film continuously into a guiding relationship with respect to a registration surface or edge extending generally parallel to the scanning plane.

Figure 1:
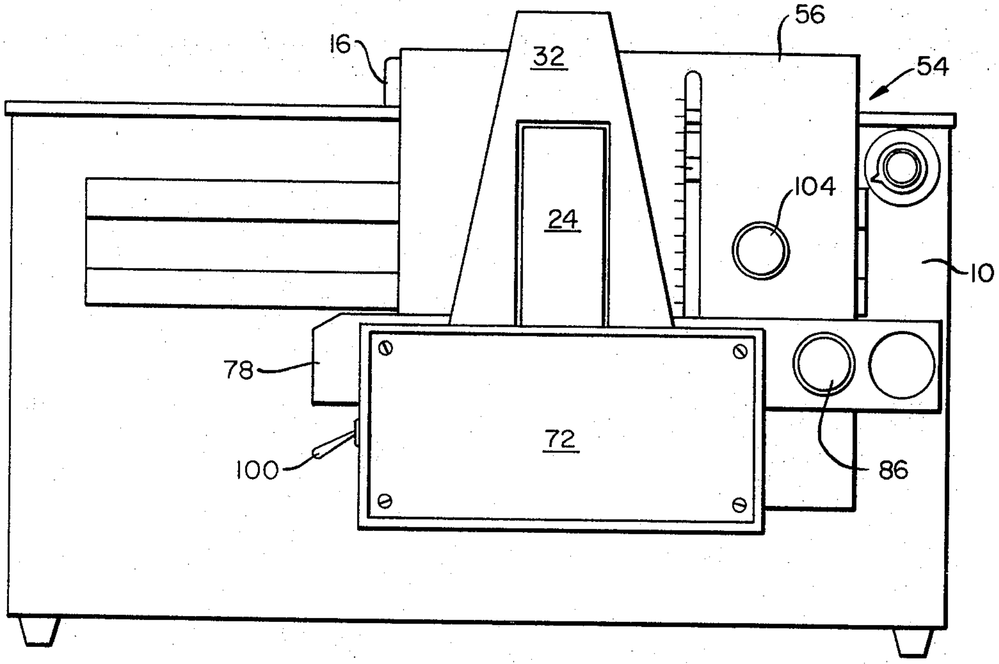
Figure 2:
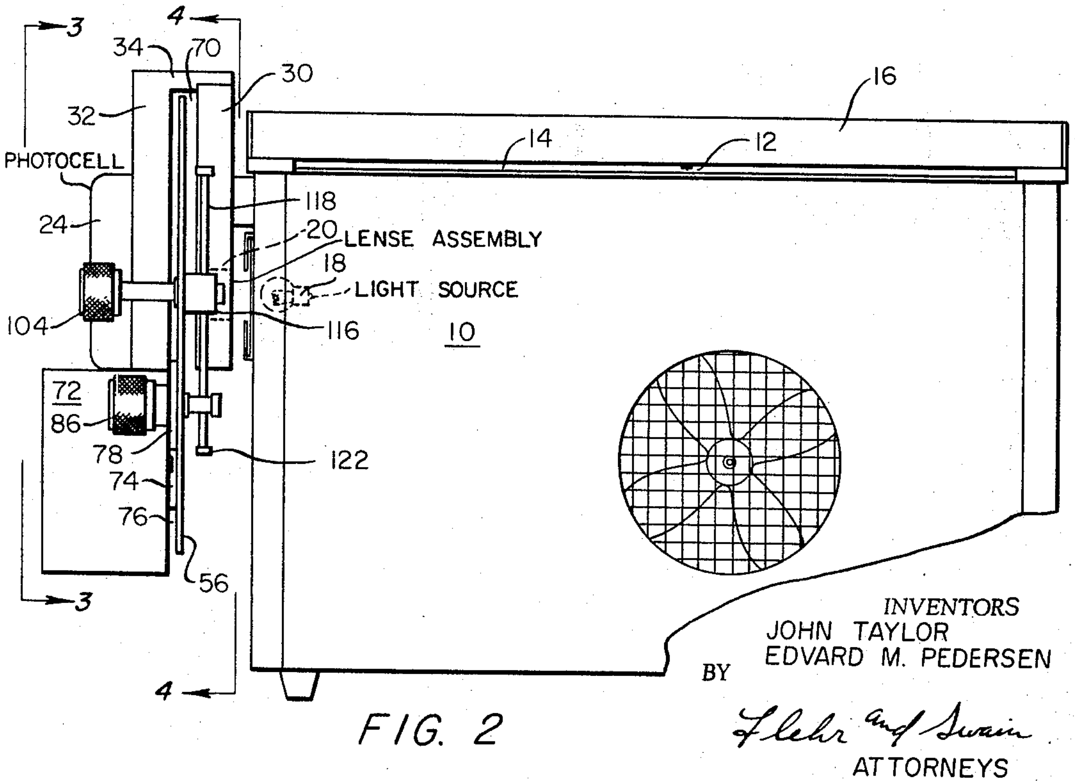

The optical scanning apparatus described herein is particularly useful in, and is shown in FIGURES 1 and 2 in conjunction with, a recording apparatus 10 employing a recording stylus 12 arranged to travel transversely and longitudinally of a plotting surface 14. Stylus 12 can be supported from a travelling beam 16, for example. Plotting apparatus 10 includes a light source 18 schematically shown in FIGURE 2. Light source 18 is arranged at the side of plotting apparatus 10 for use with the scanning apparatus to be described. An optical analyzing beam is thereby provided which includes light source 18, a spring-loaded, axially movable lens assembly 20, an elongated slit 22, and a plugable photocell unit 24. The photocell unit 24 is provided with a pair of electrodes 26 arranged to be received in sockets 28.

Figures 6, 7, 8:
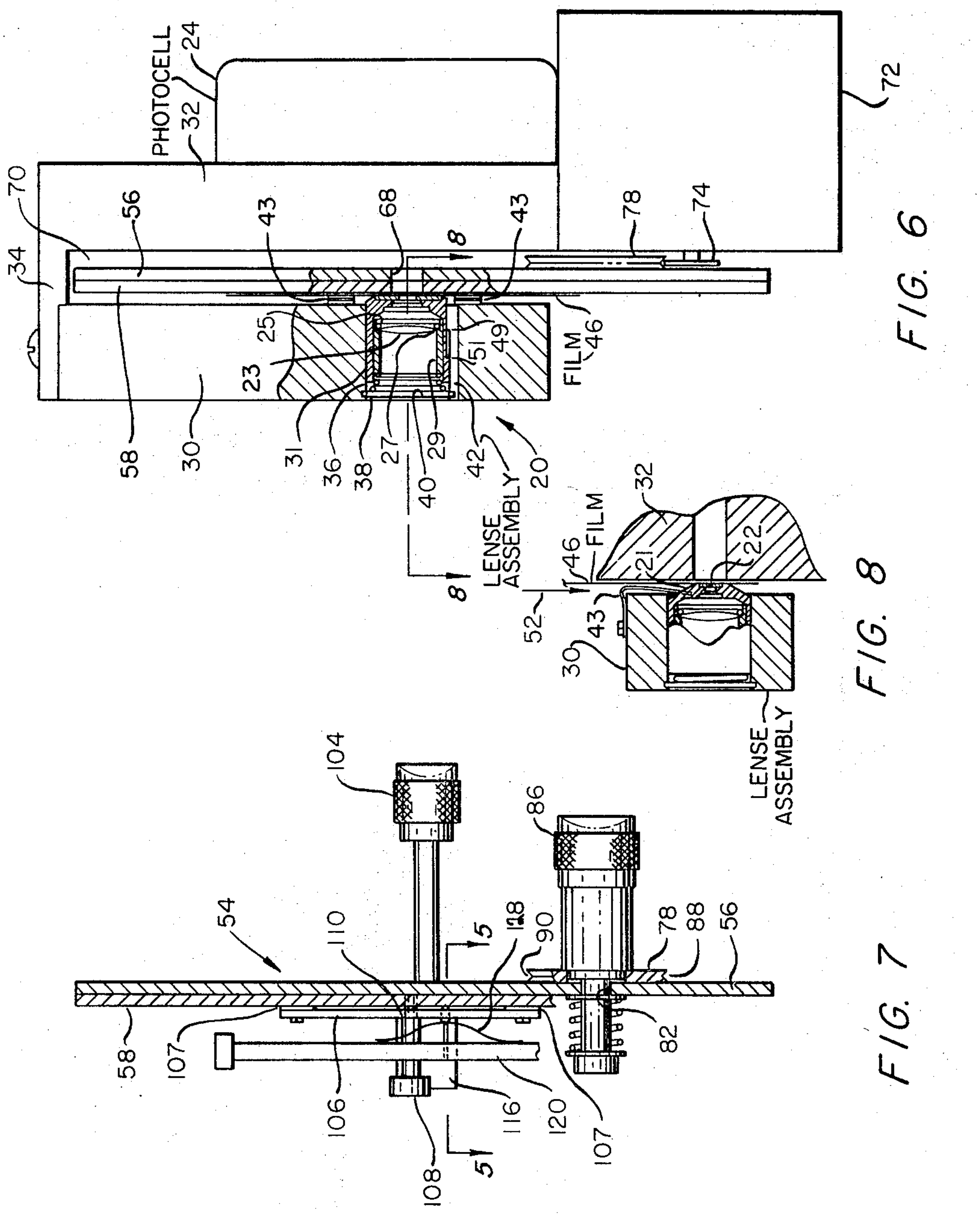
FIGURE 8 is a detailed view at line 8—8 of FIGURE 7.

As best seen in FIGURES 6 and 8, the scanning apparatus is arranged to provide a generally A shaped frame configuration formed by the two legs 30, 32 joined at their upper end by a bridge portion 34. Leg 30 serves to house the lens 20 in a cylindrical bore 36. The rear end of bore 36 includes an annular groove 40 to receive the enlarged rearmost convolution of a helical spring 38. Lens assembly 20 includes a convex lens member 23 held by a retaining ring 25 against a shoulder 27 formed inside a cylindrical sleeve 29. Sleeve 29 fits loosely within a cylindrical housing 31. As thus arranged, lens assembly 20 is adapted to slide axially of bore 36. Housing 31 is slidably keyed by means of a key 42 and keyway 45 so as to maintain slit 22 in a predetermined orientation. Keyway 45 is formed along the bottom of housing 31 whereas key 42 is seated in a groove 47 along the bottom of bore 36. Note that key 42 and keyway 45 both include a step 49, 51 to limit the axial projection of housing 31 from bore 36. Scanning slit 22 is formed in the projecting end of housing 31.

Figures 4, 5:
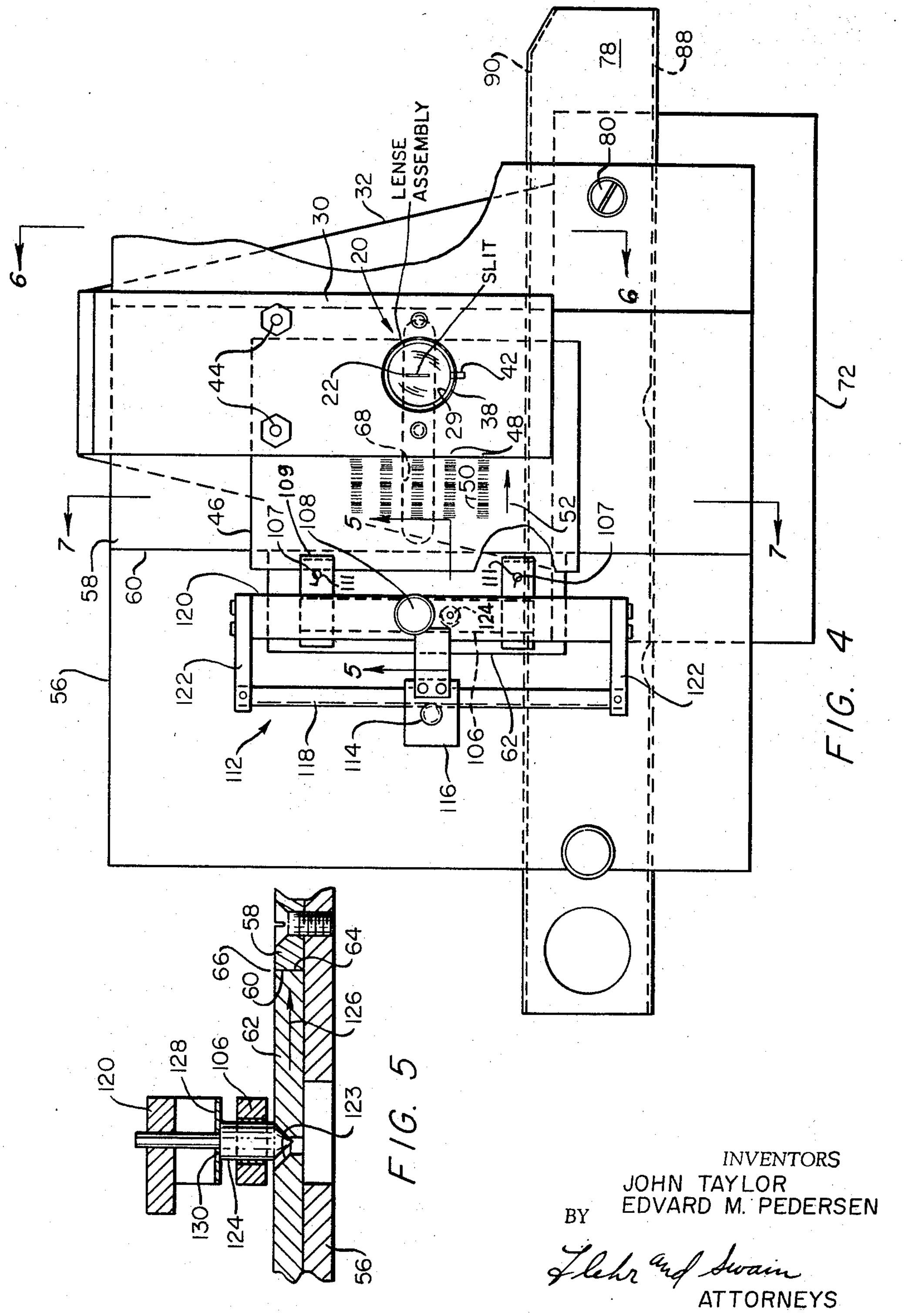

As seen in FIGURE 4, leg 30 is further provided with a pair of electrodes 44 adapted to be received in sockets (not shown) formed in the side of apparatus 10 so as to support the scanning apparatus. Electrodes 44 are electrically connected (not shown) with sockets 28 so as to provide necessary conductors to photocell unit 24.

A record medium such as a sheet of photographic film 46 prepared with a plurality of rows 48 of elongated indicia traces 50 can be scanned by the foregoing apparatus. Means are provided which serve to feed the record medium in the direction 52 of rows 48 so as to carry each of the traces 50 of a given row into parallel coincidence with a scanning plane directed through slit 22. Thus, the scanning plane is disposed normal to the record medium 46 and passes through the slit 22 parallel to the axis thereof. That is to say, the longitudinal axis of slit 22 lies in the scanning plane.

Means are provided whereby the film 46 can be adjusted so as to establish precise parallelism between the traces 50 and the scanning plane through slit 22.

Accordingly, a film support assembly 54 is provided by a flat rectangular support plate 56 formed to carry a block 58 fixed thereto. As seen in FIGURE 5, a side face 60 of block 58 is machined smooth and straight so as to form a registration surface. Film support assembly 54 further includes a sliding block 62 having a guiding face 64 also machined smooth and straight and disposed against, and in sliding contact with, registration surface 60 so as to define a registration interface 66 between blocks 58 and 62.

In general, block 62 carries a sheet of film 46 held fixed to it whereby movement of block 62 serves to move film 46 along a direction 52 parallel to the scanning plane defined through slit 22, thereby serving to register the midpoint of traces 50 with respect to the ends of slit 22, as will be described in further detail below.

Figure 3:
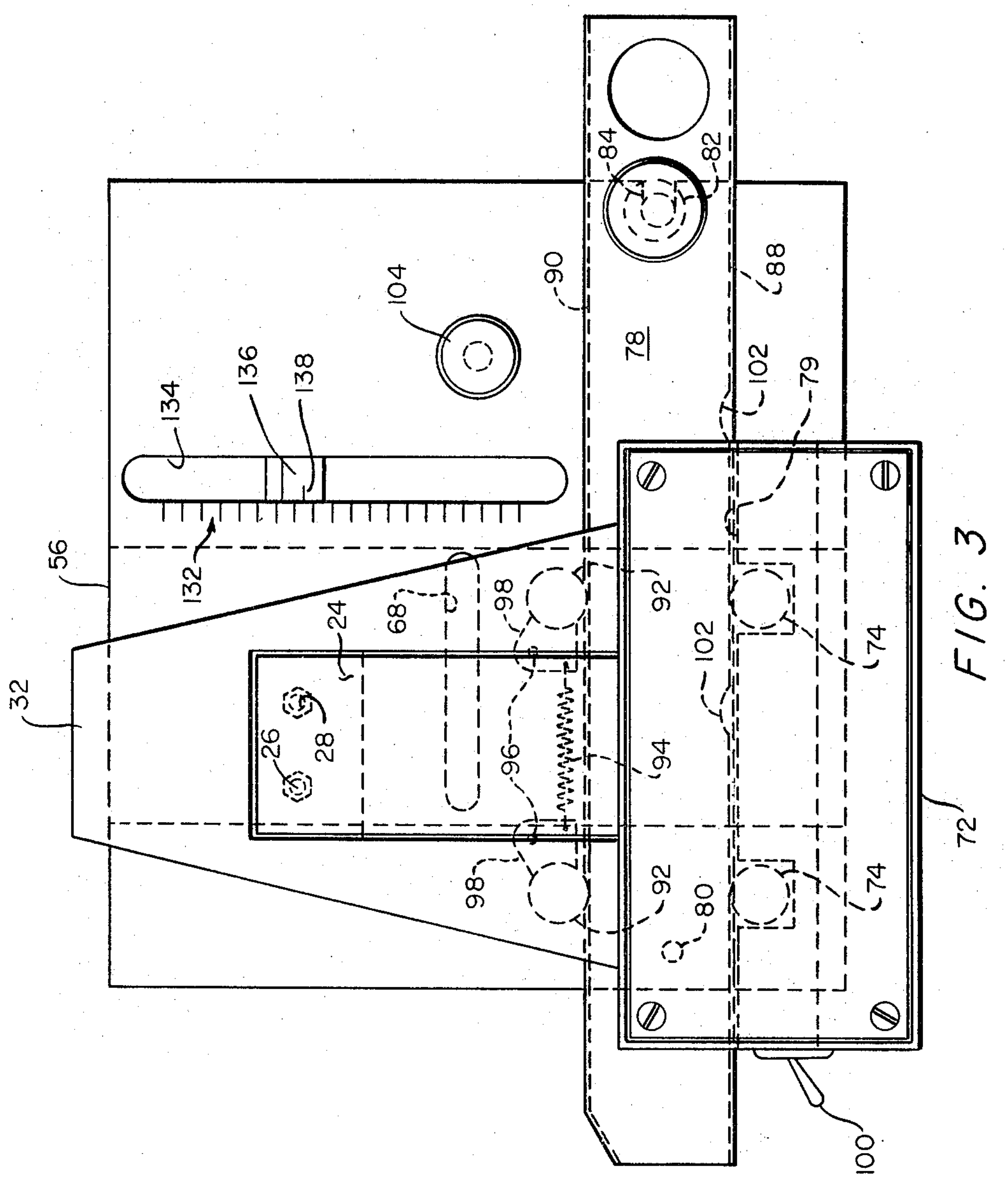
Figure 9:
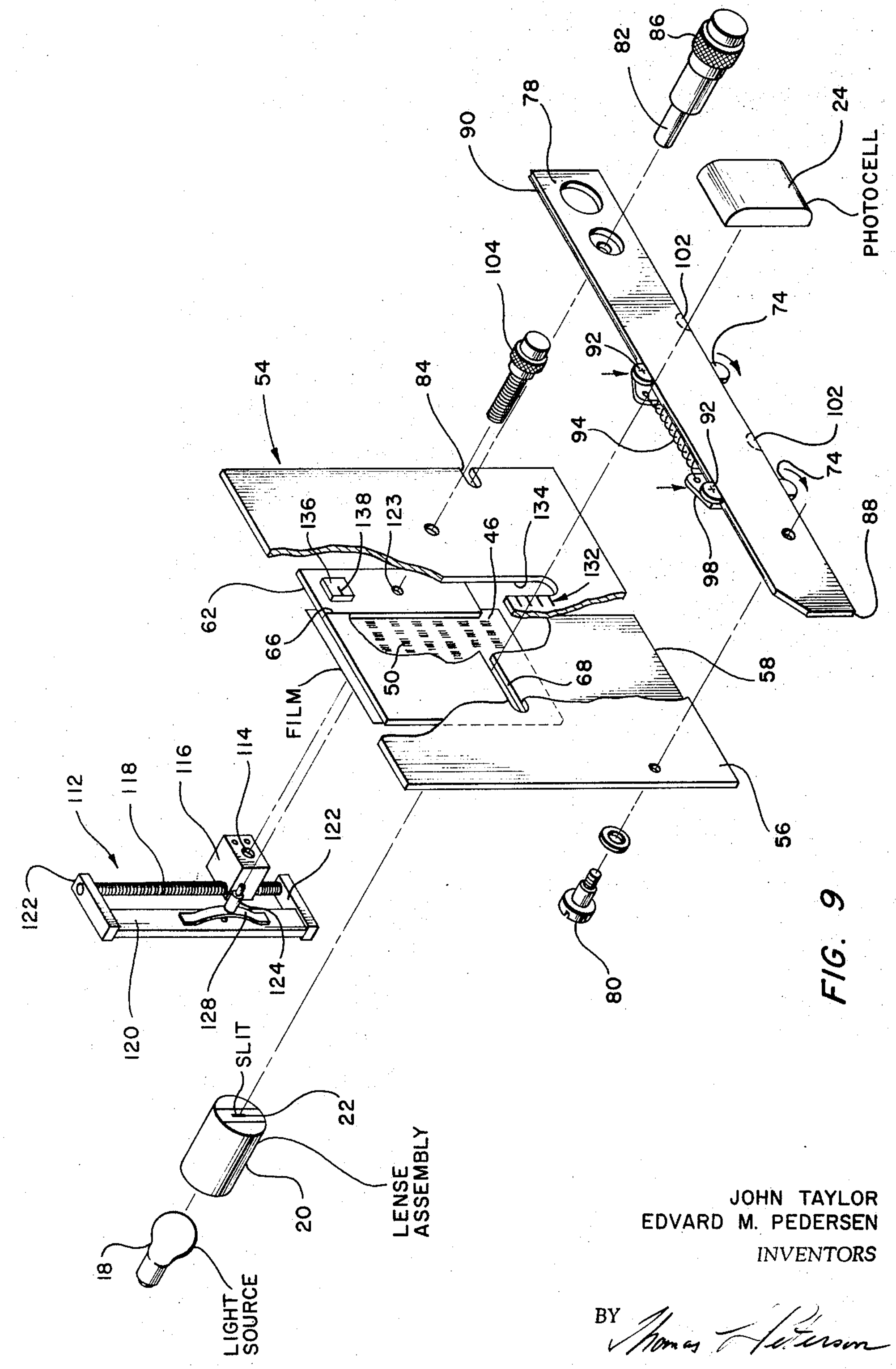
FIGURE 9 is a diagrammatic perspective view of the operative elements of the apparatus of the invention.

As seen in FIGURES 3, 7 and 9, assembly 54 includes an aperture 68 formed through plate 56 and block 58 and disposed to register with slit 22 as assembly 54 moves through the scanning plane. The sliding block 62 carries film 46 so as to align a given row 48 of indicia traces with aperture 68.

Means are provided for guiding and driving assembly 54 through the passage 70 defined between legs 30 and 32. Motive means are provided in housing 72 in the form, for example, of a fractional horsepower electric motor, speed reduction gears, and a pair of friction drive rollers 74 arranged to extend slightly beyond one face 76 of housing 72. A pair of pressure rollers 92 also extend beyond face 76. Rollers 74 and 92 define a guide way 75 to receive a guide bar 78. Guide bar 78 is pivotally carried by a pivot pin 80, and pivoted by movement of an eccentric 82 disposed in a slot 84 formed at the opposite edge of plate 56. Eccentric 82 serves to cant plate 56 somewhat to align traces with slit 22. A knurled knob 86 serves to rotate eccentric 82 so as to provide a pivoting of plate 56 with respect to bar 78 as bar 78 is being held firmly in guide way 75. The lower edge 88 of bar 78 is channeled so as to permit drive rollers 74 to travel therein. The upper edge 90 is likewise channeled and is engaged by pressure rollers 92. Rollers 92 are spring-loaded by a spring 94 so as to pivot about axes 96 of their respective roller support arms 98. Thus, rollers 92 and 74 serve to engage the upper and lower edges of bar 78 to advance film support assembly 54 along a precise predetermined straight path with respect to scanning slit 22.

While a suitable on-off switch 100 serves to generally operate the motive means in housing 72 which will normally be arranged to run continuously during a run, fixed stop means have been provided with respect to the movement of guide bar 78 and disposed to arrest movement thereof at a predetermined point in the advance of assembly 54. At the same time, the stop means permits the continuously driven rollers 74 to keep running without harm or drag on the motor. Thus, the lower edge 88 of guide bar 78 is formed with a pair of longitudinally spaced depressions 102 disposed in the path of rollers 74 whereby arrival of depressions 102 to a position adjacent the drive rollers 74 will cause bar 78 to drop downwardly to a limiting ledge 79 disposed below the periphery of rollers 74, under the urging of spring-loaded rollers 92.

From the foregoing, it will be generally appreciated that guide bar 78 and the complete film support assembly 54 will be carried in a precise straight line of advance through passage 70 so that a given row 48 of elongated indicia traces 50 can be, when disposed in front of aperture 68, scanned by slit 22.

Frequently, however, in order to obtain reliable results during certain critical optical analyses, it is necessary to establish exact parallel coincidence between the elongated traces and the scanning plane, i.e., the plane through slit 22.

Thus, after inserting guide bar 78 into the guide way defined between rollers 74 and 92, knob 86 can be used to pivot the plate 56 through a predetermined angle by infinitesimal increments and thereby establish exact parallelism.

As shown in FIGURES 6 and 8, the sheet of film 46 is arranged to overlay block 58. Lens assembly housing 31 is formed with a tapered lip 21 which serves to press against film 46 and dispose slit 22 in direct contact therewith. However, in the event that the leading edge of film 46 should diverge away from block 58 sufficiently far to miss lip 21, it is apparent that film 46 would be curled backwardly and possibly damaged. Therefore, there is provided a pair of feelers 43 which are adapted to direct the film 46, as it approaches lens assembly 20, so as to bring the leading edge of film 46 into a sufficiently close relation to the plane of block 58 to cause it to engage the surface of lip 21. It should be noted that the slope of lip 21 is rather gradual since it has been observed that if the slope is too steep, the film will tend to buckle and again provide imprecise analytical results.

Means have also been provided for varying the position of the record medium or film 46 in a direction parallel to the scanning plane so as to register the midpoint of the traces with respect to the ends of the scanning slit. Thus, as adverted to above, sliding block 62 is arranged to carry a record film fixed with respect to it and arranged whereby vertical movement of sliding member 62 is employed to bring a given row of indicia traces generally into registration with aperture 68. Assuming, however, that the vertical dimension of slit 22 defines the upper and lower scanning limits, then, the midpoint of the traces 50 of a given row 48 must be registered with respect to the ends of the slit.

As shown in FIGURES 4, 7 and 9, a relatively large knob 104, when rotated, serves to convert an applied loose movement thereof to a precision movement of slide member 62 through motion transmitting mechanism wherein notwithstanding substantial lost motion in the applied movement of knob 104, slide member 62 moves virtually free of lost motion while at the same time, it is being cammed continuously into a guiding relationship to the registration surface 60, which, it will be recalled, extends generally parallel to the scanning plane. Accordingly, since the record medium 46 is fixed with respect to member 62, movement of member 62 in this manner serves to carry the record film 46 likewise in a guiding relationship with respect to registration surface 60.

Clamping means are provided which serve to engage and fix the record medium to the slide member 62. As seen in FIGURES 4 and 7, a film clamp bar 106, having transversely extending resilient hold down fingers 107, is carried in spaced relation to slide member 62 and is clampable thereto by means of a thumb screw 108 which threadedly engages member 62 and is formed with a shoulder 110 thereon. Fingers 107 terminate in a projecting lip 109 to press against film 46. Rearwardly of lips 109, a limit pin 111 is stationed to align film 46. To clamp a film 46 between fingers 107 and member 62, therefore, requires only that thumb screw 108 be backed off sufficiently to permit the film to be inserted in the gap between lips 109 and member 62 and then after inserting the film, thumb screw 108 is screwed down tightly so as to cause fingers 107 of bar 106 to engage the film. As thus disposed, the film extends across block 58 so as to dispose the column of indicia rows in lateral alignment with aperture 68.

A motion transmitting carriage assembly 112, best seen in FIGURES 4 and 9, is driven by a pinion 114 on the stem of knob 104. Pinion 114 is journalled in a block 116 fixed to the rear face of plate 56. Pinion 114 coacts with a rack 118 which is thereby positioned vertically by knob 104. Motion transmitted via pinion 114 and rack 118 is quite loose and requires little in the way of precision manufacturing since lost motion thereat is removed by a driving connection formed between carriage assembly 112 and member 62 as now to be described.

Carriage assembly 112 is a generally rectangular configuration and the side opposite to rack 118 includes a driving arm 120. The ends of arm 120 are coupled to rack 118 by a pair of cantilever arms 122. Therefore, the driving arm 120 forms a motion transmitting carriage member which is spaced from slide member 62 and includes a rack therewith disposed generally parallel to the guiding interface 66. A camming surface in the form of a conical socket 123, as seen in FIGURE 5, is formed in the exposed face of member 62 so as to receive a cam member in the form of a conical drive pin 124. Pin 124 is axially movable to extend from arm 120 and is yieldingly urged away from arm 120 by a leaf spring 128 acting on a shoulder 130 of pin 124. Pin 124 is slightly off-axis with respect to the axis of socket 123, the axis of pin 124 being located between interface 66 and the axis of socket 123. Accordingly, the urging of pin 124 into socket 123 serves to transversely urge the registration surfaces together in the direction of arrow 126 so as to maintain a snug guiding alignment between member 62 and block 58.

The tapered point contact of pin 124 serves to provide the sole transmission of motion between rack 118 and slide member 62. It should be further noted that socket 123 is disposed generally in a central zone between the ends of member 62 so as to avoid any possible turning moments which might possibly otherwise tend to develop. Furthermore, it should be noted that the motion transmitting contact made by pin 124 provides a pivotal driving connection which permits the registration faces 60 and 64 to maintain perfect alignment.

The foregoing motion transmitting arrangement accommodates virtually any degree of lost motion at the input knob 104 without affecting accurate and steady positioning of the film by the motion transmitted to the block member 62.

Means are provide to re-establish the position of each row scanned after analysis thereof in order to re-run the row and check results. As seen in FIGURES 3 and 9, on the exposed face of plate 56, a number of scribe marks are arranged to provide a scale 132 arranged alongside a slot 134. A travelling indicator 136, having a reference mark 138, is arranged to move in slot 134 so as to provide a recordable vertical position for the disposition of each row 48 of indicia traces. In this manner, after each run is made, precise repositioning of the row can be achieved for confirmation of suspect results.

From the foregoing, it will be readily evident that an improved film transport apparatus has been provided for precision registration of a particular row of indicia traces with respect to the scanning plane and slit. Further, the single drive connection afforded by pin 24 serves to make the sliding film support bar readily removable so that film can be examined and manually handled and then replaced in the assembly.

We claim:

1. For use in apparatus having a scanning slit for scanning a series of elongated indicia traces recorded on a record medium and disposed in a row thereon extending in a direction transversely of the traces, and having driving means serving to feed the record medium in the direction of the row so as to carry each of said traces into parallel coincidence with a scanning plane normal to the record medium and passing through the slit parallel to the axis thereof, an attachment apparatus for establishing precise parallelism between said traces and said scanning plane comprising a support plate adapted to carry the record medium fixed therewith, a guide bar carrying said support plate, said bar being adapted to be engaged by the driving means and advanced in the direction of said row to move the plate and the medium in said direction, said support plate being pivotable with respect to said guide bar to pivot said medium about an axis normal thereto and parallel spaced from said plane, means serving to infinitesimally pivot said support plate through a predetermined angle to vary the angle between the axes of said traces and said plane, means for varying the position of the medium in a direction parallel to said plane to register the mid-point of the traces with respect to the ends of the slit, a registration surface generally parallel to said plane, the last named means serving to convert an applied movement entailing substantial lost motion to a movement virtually free of lost motion while camming said medium continuously into a guiding relationship to said registration surface.

2. Apparatus according to claim 1 wherein said driving means defines a guide way and said guide bar is elongated and adapted to be engaged in said way, the means for pivoting said support plate including an eccentric manually rotatable in an opening formed in the support plate, and a rotatable shaft journalled in said guide bar and connected to rotate said eccentric to pivot the support plate.

3. For use in apparatus having a scanning slit for scanning a series of elongated indicia traces recorded on a record medium and disposed in a row thereon extending in a direction transversely of the traces, apparatus for feeding the record medium in the direction of the row so as to carry each of the traces into virtually precise parallel coincidence with a scanning plane normal to the record medium and passing through the axis of the slit, said axis lying in said plane, the last named apparatus comprising means defining a fixed guide way extending in the direction of said row, a guide bar disposed in and movable along the guide way, drive means serving to advance said bar along said way, support plate means carried by said guide bar and adapted to carry the record medium fixed therewith through said plane, said support plate means being pivotable with respect to said guide bar to pivot said medium about an axis normal thereto and parallel spaced from said plane, means serving to infinitesimally pivot said support plate means through a predetermined angle to vary the angle between the traces and said plane, means for varying the position of the medium in a direction parallel to said plane to register the mid-point of the traces with respect to the ends of the slit.

4. Apparatus according to claim 3 wherein said drive means is arranged to run continuously, fixed stop means disposed with respect to said guide bar and guide way to arrest advancing movement of said guide bar at a predetermined point in the movement thereof while permitting said drive means to continue running.

5. Apparatus according to claim 4 wherein said drive means includes a friction drive roller and another roller disposed to engage said guide bar to drive same along said guide way, a pair of rollers disposed to engage said guide bar and urge said guide bar snugly against said friction roller and said other roller, a pair of depressions formed in said guide bar and disposed in the path of said first named rollers to cause the first named rollers to enter into same and thereby arrest further advance of said guide bar along said guide way.

6. Apparatus comprising means forming a scanning slit for scanning a series of elongated indicia traces recorded on a record medium and disposed in a row thereon extending in a direction transversely of the traces, a photoresponsive device, a light source, means supporting the light source to pass a beam of light through said slit to the photoresponsive device, apparatus for feeding the record medium in the direction of the row so as to carry each of the traces into virtually precise parallel coincidence with a scanning plane normal to the record medium and passing through the axis of the slit, said axis lying in said plane, the last named apparatus including means defining a fixed guide way extending in the direction of said row, a guide bar disposed to move along the guide way, drive means serving to advance the bar along said way, support plate means carried by said guide bar and adapted to carry the record medium fixed therewith through said plane, said support plate means being pivotable with respect to said guide bar to pivot said medium about an axis disposed normal thereto and parallel spaced from said plane, means serving to infinitesimally pivot said support plate means through a predetermined angle to vary the angle between the traces and said scanning plane, means for varying the position of the medium in a direction parallel to said scanning plane to register the midpoint of the traces with respect to the ends of the slit, the last named means serving to convert an applied movement entailing substantial lost motion to a movement virtually free of lost motion while camming said medium continuously into a guiding relationship with respect to a registration surface extending generally parallel to said plane.

7. Apparatus according to claim 6 wherein the last named means comprises a registration surface formed on said support plate means and extending in a direction generally parallel to said plane, a slide member having a registration surface disposed to slide in contact with the first named registration surface and be guided by same in the last named direction to provide a registration interface therebetween, said slide member having a conical seat formed therein, clamping means serving to engage said medium in fixed relation to said slide member, a motion transmitting carriage member including a rack carried therewith and disposed generally parallel to the interface, a conical drive pin extending from said carriage member and axially movable into said seat and disposed slightly off-axis with respect thereto, the axis of said seat being disposed between the axis of the pin and the registration interface, means yieldingly urging said pin axially into the seat to transversely urge said registration surfaces together at said interface, and pinion means coacting with said rack to move said slide member along said first named registration surface, said pin serving to provide the sole motion transmitting connection between said rack and said slide member.

8. Apparatus comprising means forming a scanning slit for scanning a series of elongated indicia traces recorded on a record medium and disposed in a row thereon extending in a direction transversely of the traces, means defining a scanning plane normal to the record medium and passing through the axis of the slit, means defining a fixed guide way extending in the direction of said row, a guide bar disposed to move along the guide way, drive means serving to advance the bar along said way, support plate means carried by said guide bar and adapted to carry the record medium therewith through said scanning plane, a registration surface formed on said support plate means and extending generally parallel to said scanning plane, means for varying the position of the medium in a direction substantially parallel to the scanning plane to register the mid point of the traces with respect to the ends of the slit and serving to convert an applied movement entailing substantial lost motion to a movement virtually free of lost motion while camming said medium continuously into a guiding relationship with respect to said registration surface, the last named means comprising a slide member having a registration surface disposed to slide in contact with the first named registration surface and be guided by same in the last named direction, said registration surfaces forming a registration interface therebetween, said slide member having a seat formed therein, clamping means serving to engage said medium in fixed relation to said slide member, a motion transmitting carriage member including a rack carried therewith and disposed to move the carriage member generally parallel to the interface, a single drive connection member extending from said carriage member and movable into said seat, said drive connection member being disposed to move toward said seat along an axis disposed alongside an axis centrally through the seat and spaced therefrom, the axis of the drive connection member being between the axis centrally through the seat and the registration interface, means yieldingly urging said drive connection member into the seat, said seat being formed to provide a first cam surface, a second cam surface formed on the drive connection member and formed to slidably engage said first cam surface and disposed to transversely urge said registration surfaces together at said interface, and pinion means coacting with said rack to move said slide member along said first named registration surface.

References Cited

UNITED STATES PATENTS

| | | | |
|---|---|---|---|
| 1,424,941 | 8/1922 | Pirwitz | 83—521 |
| 2,344,817 | 3/1944 | Hlavaty | 250—219 |
| 2,583,376 | 1/1952 | Huebner | 250—219 |
| 2,938,126 | 5/1960 | Adler | 250—219 |

RALPH G. NILSON, *Primary Examiner.*

J. D. WALL, *Assistant Examiner.*